March 17, 1964 — G. A. SCHLAEGEL — 3,125,015
ROTISSERIE WHEEL
Filed Dec. 17, 1959 — 2 Sheets-Sheet 1
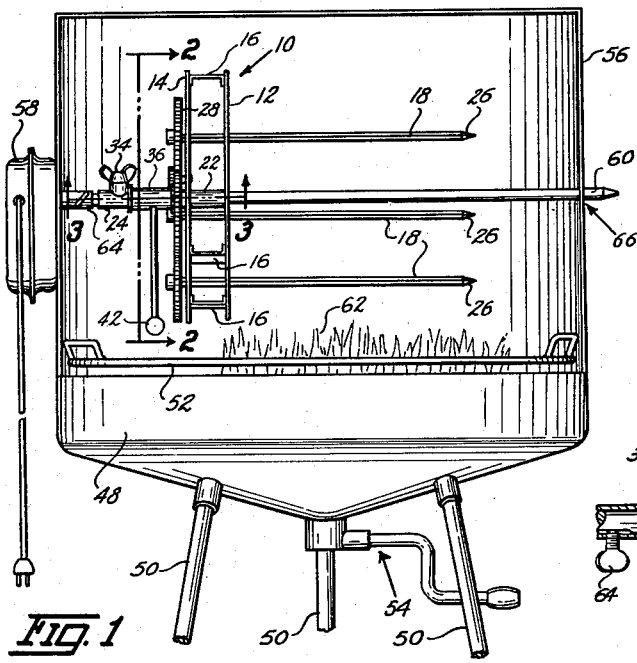
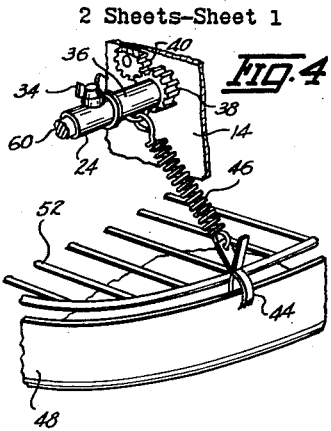
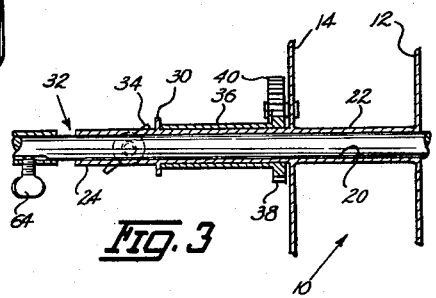
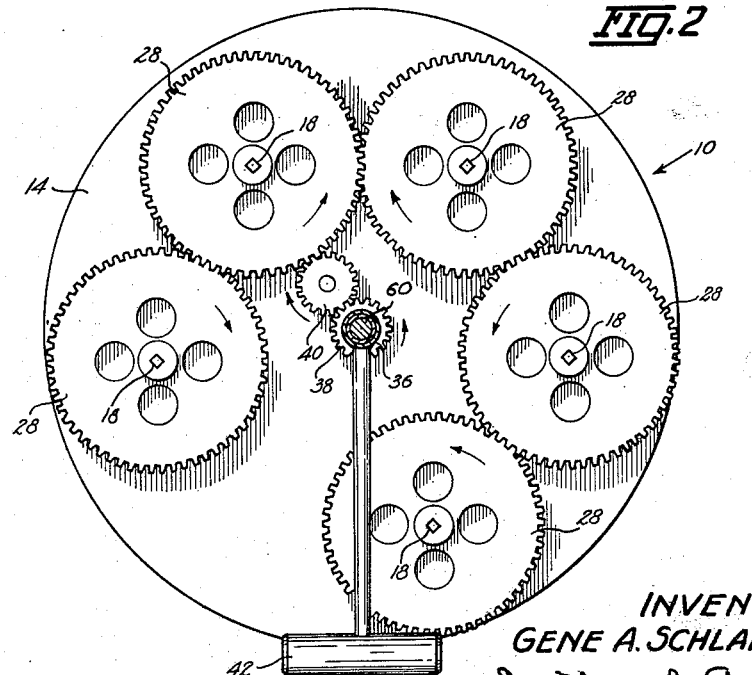
INVENTOR.
GENE A. SCHLAEGEL
BY *Morton L. Adler*
ATTORNEY.

March 17, 1964  G. A. SCHLAEGEL  3,125,015
ROTISSERIE WHEEL
Filed Dec. 17, 1959  2 Sheets-Sheet 2
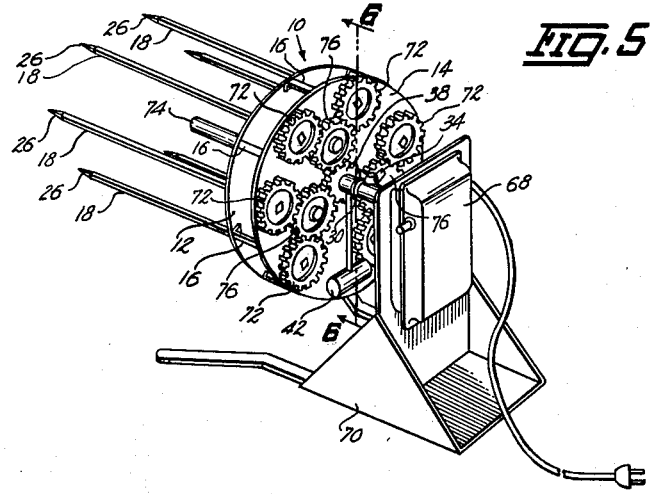
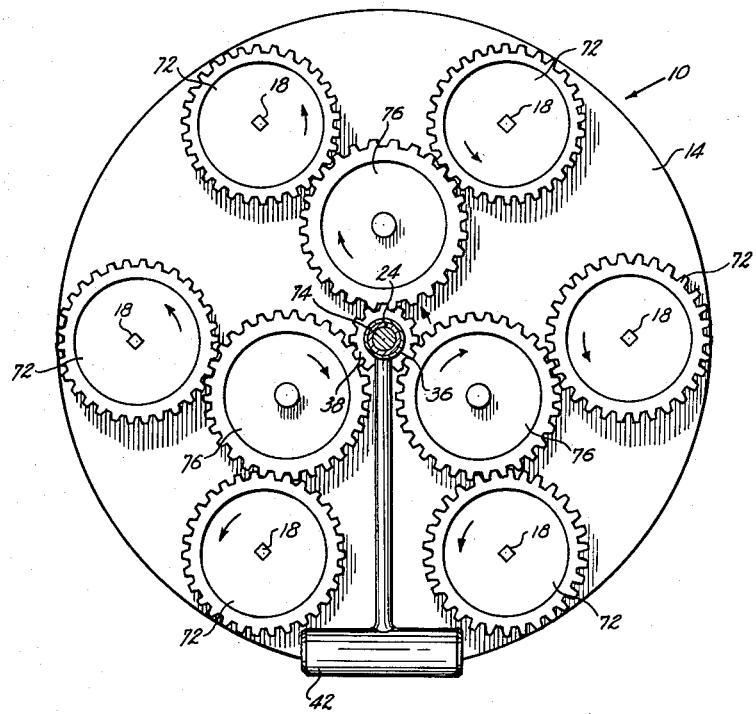
INVENTOR.
GENE A. SCHLAEGEL
BY Morton S. Adler
ATTORNEY.

United States Patent Office 3,125,015
Patented Mar. 17, 1964

3,125,015
ROTISSERIE WHEEL
Gene A. Schlaegel, Iowa City, Iowa
Filed Dec. 17, 1959, Ser. No. 860,198
7 Claims. (Cl. 99—421)

My invention relates to a novel rotisserie wheel that may be used separately or as an attachment to a spit over a brazier or in an electric oven or similar device employed for the cooking of meats, wieners, shish-ka-bobs and the like.

More particularly this invention contemplates the provision of a plurality of skewers or spits projecting in concentric spaced relationship from a support so as to be disposed over a bed of coals or other source of cooking heat and includes means for not only rotating the support on a central axis but also novel means for rotating each skewer or spit simultaneously about its own respective longitudinal axis as it rotates about the axis of the support.

Another object inhering herein is the provision of a rotisserie wheel having a plurality of spits so constructed as to continually and automatically expose a different area of food on each spit to the source of heat and from a constantly changing position relative thereto.

A further object of this invention is to provide a rotisserie wheel of the above class which when attached or mounted to a spit on the commonly known charcoal broiler or to the spit in an electric oven or the like is operated from the same source of power as the spit to which it is attached.

Other objects herein are to provide a rotisserie wheel as characterized that is economical in manufacture, durable in construction and extremely efficient for its intended purpose.

Further objects and the more obvious advantages of the invention will be mentioned or else appear plainly from the description which follows.

This invention consists of novel parts and combination of parts to be hereinafter described whereby the objects set forth are attained, as pointed out in the claims, and illustrated in the accompanying drawings, in which:

FIG. 1 is a side elevational view of a preferred embodiment of this invention illustrated in associated with a common form of a charcoal broiler or brazier, FIG. 2 is an enlarged end view taken from the line 2—2 of FIG. 1, FIG. 3 is a longitudinal section view taken on the line 3—3 of FIG. 1, FIG. 4 is an enlarged fragmentary perspective view illustrating a modified form of securing the spur gear or pinion used with this invention, FIG. 5 is a perspective view of this invention showing a modified arrangement of the gearing for the several spits associated therewith, and FIG. 6 is an enlarged end view taken from the line 6—6 of FIG. 5.

Referring to the drawings a support member designated generally by the numeral 10 is preferably of a disc shape and preferably comprises two disc plates 12 and 14 held in spaced axial alignment by a plurality of spaced peripheral brackets or braces 16. While support 10 may be one solid piece, the use of the two members 12 and 14 reduces weight and costs and serves to adequately support the skewers or spits 18 which are each rotatably mounted thereto so as to project perpendicularly from plate 12 in a concentric spaced relationship as shown in FIG. 1. Spits 18 are preferably square in cross section to provide a better holding surface on meats placed thereon.

Support 10 is provided with an axial opening 20 which, as illustrated in FIG. 3 showing the use of plates 12 and 14, is defined by the hollow hub 22 and includes a hollow bearing member 24 projecting from plate 14 in axial alignment. Member 24 as shown may be integral with hub 22 so as to be an actual extension thereof but is given a distinguishing reference number because of its function, as will later appear, that is the same whether member 10 is composed of a single part requiring no separate hub 22 as such or is in the preferred form disclosed.

The major length of each spit 18, terminating in a pointed or sharpened end 26 projects outwardly from one side 12 of support 10, as indicated, and their respective opposite ends project slightly beyond the opposite side 14 of support 10 where they are each suitably secured to the axis of a respective gear wheel 28 for rotation therewith. Such wheels 28 are concentrically arranged relative to side or plate 14 of support 10 and each is in a meshing relationship with at least one of the others as seen in FIG. 2.

In such figure, I have shown five wheels 28 indicating the use of a five spit arrangement. As a result, three of the wheels 28 are in meshing engagement with two other wheels, and two will mesh with only one other for obvious reasons. With an even number of wheels 28, which may be used if desired, all would mesh with two others but this in nowise makes any changes in the principle of this invention.

Referring again to FIG. 3, bearing 24 includes a peripheral flange 30 intermediate its outer end 32 and side 14 of support 10 and a set screw 34 near end 32. A sleeve or collar 36 is carried by bearing 24 intermediate flange 30 and side 14 with flange 30 serving as a stop to limit movement of the sleeve toward end 32. The other end of sleeve 36 is secured to a spur gear or pinion 38 disposed adjacent support side 14 as shown. A second spur or pinion gear 40 is rotatably secured to side 14 so as to be in meshing engagement with gear 38 and with one of the gears 28. A weight or anchor 42 in any suitable form is secured to sleeve 36 so as to preferably depend therefrom in the form of a pendulum (FIG. 2) in a free swinging action but may be in the form of clamp 44 (FIG. 4) for attachment to a fixed member and connected to sleeve 36 by means of a spring 46 or the like as will be referred to in more detail hereinafter.

This rotisserie wheel as thus far described is more particularly designed for use as an attachment on a motor operated spit such as is present in charcoal broilers, electric ovens and the like and as illustrative of such use a common form of charcoal brazier is shown in FIG. 1 which includes the base or fire bowl 48 supported by legs 50 and a grill 52 susceptible of vertical adjustment by means of a crank assembly 54 in a well known manner. Bowl 48 is generally circular and supports an upstanding semicircular shield 56. A small electric motor 58 is mounted on shield 56 to receive and slowly rotate the spit 60 which will extend over the coals or source of heat 62 to the opposite side of shield 56. Normally meat to be cooked is placed on spit 60 and my invention is adapted to substantially increase the amount that can be cooked at any one time and to improve the cooking efficiencies over the single spit 60.

To use my rotisserie wheel on a motor operated spit apparatus as shown in FIG. 1 or one having a similarly arranged spit and motor, spit 60 is withdrawn from motor 58 by loosening the set screw 64 so that support 10 can be mounted thereon by passing spit 60 through hub 22 and bearing member 24. One end of spit 60 is then re-engaged with motor 58 by tightening screw 64 and the other end of spit 60 is placed in its regular support on the other side of shield 56 indicated at point 66 in FIG. 1. Set screw 34 on bearing 24 is then tightened against spit 60 so that support 10 will rotate with spit 60 under power from motor 58. In this position, collar or sleeve 36 while mounted on bearing member 24 is not attached thereto and bearing 24 can rotate independently thereof as follows.

As support 10 rotates with spit 60, gear wheels 28 and 40 also rotate about the axis of such support and since gear 40 is in mesh with gear 38 this initially tends to rotate gear 38. However, gear 38 is not attached to plate 14 as indicated above and upon its initial partial rotation, the pendulum-like weight or anchor 42 is swung or moved slightly from its vertical depending position. Being attached to collar 36, which in effect is an integral part of gear 38, weight 42 returns by gravity to its vertical position whereby gear wheel 38, except for the very slight oscillation as weight 42 is alternately slightly moved from its vertical plane and returns to such position, is anchored for all practical purposes and remains substantially stationary. As a result, the rotation of support 10 results in gear wheel 40 rotating on its own axis as it moves or walks around gear 38 and this in turn causes rotation of the several gears 28 as is apparent. The ratio of gears 38 and 40 is one to one, and that of gear 40 and 28 is one to four so that spits 18 will rotate on their individual longitudinal axis one quarter turn to each turn of support 10. This is, of course, an arbitrary ratio which may be varied as desired. From this arrangement it will be appreciated that spits 18 not only rotate around spit 60 so as to constantly change their relative position to the heat 62, but they also rotate about their individual longitudinal axis to continually expose different portions of any meat thereon toward the fire. Such an arrangement eliminates any need for manual tending of the food and provides the advantage of constant rotation as with the central spit 60 together with the constantly changing position of the spits 18 relative to the source of heat 62 which is not afforded by spit 60.

With reference to FIG. 4, I have shown that collar 36 may be fixedly anchored to bowl 48 by the spring loaded clamp 44. Such an anchor may be rigid instead of yieldable as shown since the important feature is to hold gear 38 against rotation by gear 40 and the use of spring 44 tends to lessen the strain on motor 58 as does the swingable action of anchor 42 shown in FIG. 2. It is thus apparent that rotation of gears 28 depends upon gear 38 being held either completely stationary or substantially so and any suitable or equivalent means to those shown to accomplish this purpose is deemed within the purview of this invention.

In FIGS. 5 and 6 my rotisserie wheel is shown mounted for use with an electric motor 68 supported by a stand 70 whereby it may be used independently of a brazier as shown in FIG. 1. Also in FIGS. 5 and 6 where like parts to those previously described have been given like numerals, I have shown a modified gear wheel arrangement for rotating spits 18. Here I have used six spits 18 concentrically arranged on support 10 and rotatable relative thereto, the same being attached respectively for rotation to gear wheels 72 on plate 14 as shown in FIG. 6. The arrangement of bearing 24, collar 36, gear 38 and anchor 42 is the same as previously described, with support 10 being mounted upon shaft 74 which is attached to motor 68 the same as spit 60 is attached to motor 58. It will be noted, however, that shaft 74 is relatively short compared to spit 60 since it serves only to carry support 10 and is not required to extend to a support such as shield 56 in FIG. 1. For such purposes it will be understood that motor 68 and stand 70 will be constructed of appropriate strength.

Also on plate 14 in a concentric pattern and intermediate gear 38 and gears 72 there is a plurality of intermediate gear wheels 76 rotatably mounted the same as gear 40 in FIG. 2. Each gear 76 is in mesh with gear 38 and with two other gears 72. As seen in FIG. 6 none of the gears 72 are in mesh with each other but rather are arranged in pairs with each pair meshing with one of the gears 76. Thus as support 10 rotates with shaft 74, gear 38 is held by anchor or weight 42 as described above whereby the rotation of gears 74 moving around gear 38 rotates gears 72 to rotate spits 18. Arrows in FIGS. 2 and 6 indicate the direction of rotation of the respective gears shown.

It may be pointed out relative to FIG. 6 that spits 18 can be attached to gear wheels 76, if desired, so as to eliminate gears 72. This would of course bring spits 18 into a smaller concentric spacing and preferably I have extended such spacing by the use of gears 72 nearer the perimeter of side or plate 14 as shown. The ratio between gear 38 and gears 72 and 76 (FIG. 6) is one to two and one half but may be varied as above pointed out relative to the gearing in FIG. 2.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:
1. A rotisserie wheel, comprising a support member adapted for rotation in a vertical plane, a plurality of spits rotatably secured to said support member so that their major lengths extend therefrom in the same direction on a horizontal plane and in a concentric spaced relationship relative to said support member, a gear wheel carried by each respective spit, each of said gear wheels in mesh with at least one of the other of said wheels, a bearing member in axial alignment with and secured to said support member for rotation therewith, a spur gear carried by said bearing member, said bearing member susceptible of rotation independently of said spur gear, said support member adapted for mounting on a motor driven shaft for rotation therewith, a second gear wheel rotatably mounted to said support member in mesh with said spur gear and at least one of said first mentioned gear wheels, a pendulum secured at one end to said spur gear so as to depend therefrom, a weight means on the free end of said pendulum, and said pendulum being maintained in a depending relationship to said spur gear by gravity during rotation of said support member to thereby hold said spur gear against rotation.

2. A rotisserie wheel, comprising a support member adapted for rotation in a vertical plane, a plurality of spits rotatably secured to said support member so that their major lengths extend therefrom in the same direction on a horizontal plane and in a concentric spaced relationship relative to said support member, a gear wheel carried by each respective spit, a bearing member in axial alignment with and secured to said support member for rotation therewith, a spur gear carried by said bearing member, said bearing member susceptible of rotation independently of said spur gear, said support member adapted for mounting on a motor driven shaft for rotation therewith, means associating said spur gear and said wheels for transmitting motion therebetween and means to anchor said spur gear against rotation during rotation of said support member whereby a rotary motion is transmitted to said gear wheels as they move with said support member about said spur gear; said means comprising a pendulum secured at one end to said spur gear so as to depend therefrom, a weight means on the free end of said pendulum, and said pendulum being maintained in a depending relationship to said spur gear by gravity during rotation of said support member to thereby hold said spur gear against rotation.

3. A rotisserie wheel, comprising a support member adapted for rotation about a central axis, a plurality of spits rotatably secured to said support member so that their major lengths extend therefrom in the same direction on a horizontal plane and in a concentric spaced relationship relative to said support member, a gear wheel carried by each respective spit, a bearing member in axial alignment with and secured to said support member for rotation therewith, a spur gear carried by said bearing member, said bearing member susceptible of rotation independently of said spur gear, said support member adapted for mounting on a motor driven shaft for rotation therewith, means transmitting motion between said spur gear and said gear wheels, a pendulum-like weighted anchor connected to said spur gear in depending relationship thereto and maintained in such depending relationship by gravity, said anchor holding said spur gear against rotation during rotation of said bearing member, and as said support member with said gear wheels thereon is rotated said means for transmitting motion is effective to rotate said respective gears about their individual axis.

4. A device as defined in claim 3 wherein the individual rotation of said gear wheels is continuous.

5. A device as defined in claim 3 wherein the individual rotation of said gear wheels occurs simultaneously.

6. A device as defined in claim 3 wherein the individual rotation of said gear wheels occurs simultaneously and is continuous during rotation of said support member.

7. In a rotisserie wheel, a support member adapted for rotation about a central axis in a vertical plane, a spit rotatably secured to said support member for rotation about its longitudinal axis, said spit projecting from said support member in a horizontal plane from a point radially spaced from the axis of said support member, a gear wheel on said spit, an axially disposed bearing member on said support member for rotation therewith, a spur gear carried by said bearing member, said bearing member being rotatable independently of said spur gear, said gear wheel and spur gear bearing operatively connected, a freely movable weighted anchor connected to said spur gear so as to extend radially therefrom in depending relationship thereto, the weight on said anchor being such as to maintain its depending position by gravity for holding said spur gear against rotation during rotation of said bearing member, and as said support member is rotated said gear wheel acting against said spur gear to effect the continuous rotation of said gear wheel about its individual axis as it rotates with said support member.

References Cited in the file of this patent

UNITED STATES PATENTS

| | | |
|---|---|---|
| 1,699,857 | Ruegger | Jan. 22, 1929 |
| 1,785,204 | Nelson | Dec. 16, 1930 |
| 1,870,476 | Babcock | Aug. 9, 1932 |
| 2,324,233 | Parsons | July 13, 1943 |
| 2,985,096 | Wolske | May 23, 1961 |

FOREIGN PATENTS

| | | |
|---|---|---|
| 853,400 | France | Nov. 4, 1938 |